(12) United States Patent
Smith et al.

(10) Patent No.: US 10,417,708 B2
(45) Date of Patent: Sep. 17, 2019

(54) HYBRID TRADING SYSTEM FOR CONCURRENTLY TRADING SECURITIES OR DERIVATIVES THROUGH BOTH ELECTRONIC AND OPEN-OUTCRY TRADING MECHANISMS

(71) Applicants: Eileen C. Smith, Chicago, IL (US); Anthony Montesano, Chicago, IL (US); Edward T. Tilly, Barrington, IL (US); Mark A. Esposito, Chicago, IL (US); Stuart J. Kipnes, Chicago, IL (US); Anthony J. Carone, Chicago, IL (US)

(72) Inventors: Eileen C. Smith, Chicago, IL (US); Anthony Montesano, Chicago, IL (US); Edward T. Tilly, Barrington, IL (US); Mark A. Esposito, Chicago, IL (US); Stuart J. Kipnes, Chicago, IL (US); Anthony J. Carone, Chicago, IL (US)

(73) Assignee: Cboe Exchange, Inc., Chicago, IL (US)

( * ) Notice: Subject to any disclaimer, the term of this patent is extended or adjusted under 35 U.S.C. 154(b) by 11 days.

(21) Appl. No.: 13/715,476

(22) Filed: Dec. 14, 2012

(65) Prior Publication Data
US 2013/0238481 A1    Sep. 12, 2013

Related U.S. Application Data

(62) Division of application No. 12/560,981, filed on Sep. 16, 2009, now Pat. No. 8,346,652, which is a division
(Continued)

(51) Int. Cl.
*G06Q 40/04* (2012.01)
*G06Q 40/00* (2012.01)

(52) U.S. Cl.
CPC ............. *G06Q 40/04* (2013.01); *G06Q 40/00* (2013.01)

(58) Field of Classification Search
CPC .............................. G06Q 40/00; G06Q 40/04
(Continued)

(56) References Cited

U.S. PATENT DOCUMENTS

| 3,573,747 A | 4/1971 | Adams et al. |
| 3,581,072 A | 5/1971 | Nymeyer |

(Continued)

FOREIGN PATENT DOCUMENTS

| EP | 0 752 135 B1 | 2/1999 |
| EP | 0 952 536 A1 | 10/1999 |

(Continued)

OTHER PUBLICATIONS

Evans et al. "The Effects of Electronic Trading System on Open-outcry Commodity Exchange", Social Science 410, Nov. 1998.
(Continued)

*Primary Examiner* — Robert R Niquette
*Assistant Examiner* — Liz P Nguyen
(74) *Attorney, Agent, or Firm* — Brinks Gilson & Lione

(57) ABSTRACT

A system and method of allocating orders in an exchange configured for trading by a combination of electronic and open-outcry trading mechanisms is provided. One method includes permitting multiple quotes to be disseminated to the market, but limiting market making to only those entities having a physical presence on the floor of the exchange. Methods of enhancing the hybrid electronic and open-outcry exchange also include automatically eliminating crossed quotes and locked quotes while permitting certain orders to trade against locked quotes.

6 Claims, 6 Drawing Sheets

Related U.S. Application Data of application No. 10/423,201, filed on Apr. 24, 2003, now Pat. No. 7,613,650.

(58) Field of Classification Search
USPC .......................................................... 705/35
See application file for complete search history.

(56) References Cited

U.S. PATENT DOCUMENTS

| | | |
|---|---|---|
| 4,412,287 A | 10/1983 | Braddock, III |
| 4,674,044 A | 6/1987 | Kalmus et al. |
| 4,903,201 A | 2/1990 | Wagner |
| 4,980,826 A | 12/1990 | Wagner |
| 5,038,284 A | 8/1991 | Kramer |
| 5,101,353 A | 3/1992 | Lupien et al. |
| 5,136,501 A | 8/1992 | Silverman et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,315,634 A | 5/1994 | Tanaka et al. |
| 5,557,517 A | 9/1996 | Daughterty, III |
| 5,664,115 A | 9/1997 | Fraser |
| 5,689,652 A | 11/1997 | Lupien et al. |
| 5,715,402 A | 2/1998 | Popolo |
| 5,774,877 A | 6/1998 | Patterson, Jr. et al. |
| 5,787,402 A | 7/1998 | Potter et al. |
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,813,009 A | 9/1998 | Johnson et al. |
| 5,819,237 A | 10/1998 | Garman |
| 5,845,266 A | 12/1998 | Lupien et al. |
| 5,873,071 A | 2/1999 | Ferstenberg et al. |
| 5,905,974 A | 5/1999 | Fraser et al. |
| 5,913,202 A | 6/1999 | Motoyama |
| 5,915,209 A | 6/1999 | Lawrence |
| 5,915,245 A | 6/1999 | Patterson, Jr. et al. |
| 5,924,082 A | 7/1999 | Silverman et al. |
| 5,950,176 A | 9/1999 | Keiser et al. |
| 5,950,177 A | 9/1999 | Lupien et al. |
| 5,963,923 A | 10/1999 | Garber |
| 5,970,479 A | 10/1999 | Shepherd |
| 5,978,779 A | 11/1999 | Stein et al. |
| 6,012,046 A | 1/2000 | Lupien et al. |
| 6,014,627 A | 1/2000 | Togher et al. |
| 6,014,643 A | 1/2000 | Minton |
| 6,016,483 A | 1/2000 | Rickard et al. |
| 6,018,722 A | 1/2000 | Ray et al. |
| 6,021,397 A | 2/2000 | Jones et al. |
| 6,035,288 A | 3/2000 | Solomon |
| 6,076,068 A | 6/2000 | DeLapa et al. |
| 6,119,103 A | 9/2000 | Basch et al. |
| 6,195,647 B1 | 2/2001 | Martyn et al. |
| 6,199,050 B1 | 3/2001 | Alaia et al. |
| 6,230,146 B1 | 5/2001 | Alaia et al. |
| 6,247,000 B1 | 6/2001 | Hawkins et al. |
| 6,263,321 B1 | 7/2001 | Daughtery, III |
| 6,266,651 B1 | 7/2001 | Woolston |
| 6,269,346 B1 | 7/2001 | Cristofich et al. |
| 6,272,474 B1 | 8/2001 | Garcia |
| 6,278,982 B1 | 8/2001 | Korhammer et al. |
| 6,282,521 B1 | 8/2001 | Howorka |
| 6,285,989 B1 | 9/2001 | Shoham |
| 6,317,727 B1 | 11/2001 | May |
| 6,317,728 B1 | 11/2001 | Kane |
| 6,321,212 B1 | 11/2001 | Lange |
| 6,377,940 B2 | 4/2002 | Tilfors et al. |
| 6,405,180 B2 | 6/2002 | Tilfors et al. |
| 6,421,653 B1 | 7/2002 | May |
| 6,493,682 B1 | 12/2002 | Horrigan et al. |
| 6,505,174 B1 | 1/2003 | Keiser et al. |
| 6,505,175 B1 | 1/2003 | Silverman et al. |
| 6,539,362 B1 | 3/2003 | Patterson, Jr. et al. |
| 6,560,580 B1 | 5/2003 | Fraser et al. |
| 6,564,192 B1 | 5/2003 | Kinney, Jr. et al. |
| 6,601,627 B2 | 8/2003 | Kasai et al. |
| 6,618,707 B1 | 9/2003 | Gary |
| 6,647,374 B2 | 11/2003 | Kansal |
| 7,039,610 B2 | 5/2006 | Morano et al. |
| 7,047,218 B1 | 5/2006 | Wallman |
| 7,085,738 B2 | 8/2006 | Tarrant |
| 7,099,839 B2 | 8/2006 | Madoff et al. |
| 7,225,153 B2 | 5/2007 | Lange |
| 7,233,922 B2 | 6/2007 | Asher et al. |
| 7,246,093 B1 * | 7/2007 | Katz ..................... G06Q 40/00 705/37 |
| 7,260,554 B2 | 8/2007 | Morano et al. |
| 7,296,025 B2 | 11/2007 | Kung et al. |
| 7,333,950 B2 | 2/2008 | Shidler et al. |
| 7,389,264 B2 | 6/2008 | Kemp, II et al. |
| 7,512,561 B2 | 3/2009 | Burns |
| 7,552,083 B2 | 6/2009 | Carone et al. |
| 7,813,994 B1 | 10/2010 | Ebersole et al. |
| 8,296,218 B2 | 10/2012 | Tilly et al. |
| 8,346,652 B2 | 1/2013 | Smith et al. |
| 2001/0051908 A1 | 12/2001 | Foster et al. |
| 2002/0002530 A1 | 1/2002 | May |
| 2002/0013760 A1 | 1/2002 | Arora et al. |
| 2002/0019799 A1 | 2/2002 | Ginsberg et al. |
| 2002/0032629 A1 | 3/2002 | Siegel, Jr. et al. |
| 2002/0052816 A1 | 5/2002 | Clenaghan et al. |
| 2002/0073016 A1 | 6/2002 | Furbush et al. |
| 2002/0082967 A1 | 6/2002 | Kaminsky et al. |
| 2002/0087365 A1 | 7/2002 | Kavanaugh |
| 2002/0095369 A1 | 7/2002 | Kaplan et al. |
| 2002/0099640 A1 | 7/2002 | Lange |
| 2002/0103738 A1 | 8/2002 | Griebel et al. |
| 2002/0128952 A1 * | 9/2002 | Melkomian ............ G06Q 40/04 705/37 |
| 2002/0138401 A1 | 9/2002 | Allen et al. |
| 2002/0147670 A1 | 10/2002 | Lange |
| 2002/0152152 A1 | 10/2002 | Abdelnur et al. |
| 2002/0156716 A1 | 10/2002 | Adatia |
| 2002/0156718 A1 | 10/2002 | Olsen et al. |
| 2002/0198813 A1 | 12/2002 | Patterson, Jr. et al. |
| 2003/0004858 A1 | 1/2003 | Schmitz et al. |
| 2003/0009411 A1 | 1/2003 | Ram et al. |
| 2003/0018567 A1 | 1/2003 | Flitcroft et al. |
| 2003/0018569 A1 | 1/2003 | Eisenthal et al. |
| 2003/0028462 A1 | 2/2003 | Fuhrman et al. |
| 2003/0028468 A1 | 2/2003 | Wong et al. |
| 2003/0093352 A1 | 5/2003 | Muralidhar et al. |
| 2003/0097319 A1 | 5/2003 | Moldovan et al. |
| 2003/0097325 A1 | 5/2003 | Friesen et al. |
| 2003/0115128 A1 | 6/2003 | Lange et al. |
| 2003/0126068 A1 | 7/2003 | Hauk et al. |
| 2003/0139998 A1 | 7/2003 | Gilbert et al. |
| 2003/0167175 A1 | 9/2003 | Salom |
| 2003/0177077 A1 | 9/2003 | Norman |
| 2003/0182220 A1 | 9/2003 | Galant |
| 2003/0208430 A1 | 11/2003 | Gershon |
| 2003/0220865 A1 | 11/2003 | Lutnick |
| 2003/0225657 A1 | 12/2003 | Whaley et al. |
| 2003/0225658 A1 | 12/2003 | Whaley |
| 2003/0236738 A1 | 12/2003 | Lange et al. |
| 2004/0019554 A1 | 1/2004 | Merold et al. |
| 2004/0024681 A1 | 2/2004 | Moore et al. |
| 2004/0030630 A1 | 2/2004 | Tilfors et al. |
| 2004/0088242 A1 | 5/2004 | Ascher et al. |
| 2004/0103050 A1 | 5/2004 | Long |
| 2004/0111358 A1 | 6/2004 | Lange et al. |
| 2004/0117284 A1 | 6/2004 | Speth |
| 2004/0133439 A1 | 7/2004 | Noetzold et al. |
| 2004/0148249 A1 | 7/2004 | Kinnear |
| 2004/0158520 A1 | 8/2004 | Noh |
| 2004/0172352 A1 | 9/2004 | Deretz |
| 2004/0199450 A1 * | 10/2004 | Johnston et al. ............... 705/37 |
| 2004/0215538 A1 | 10/2004 | Smith et al. |
| 2004/0236636 A1 | 11/2004 | Lutnick et al. |
| 2004/0254804 A1 | 12/2004 | Peterffy et al. |
| 2004/0267657 A1 | 12/2004 | Hecht |
| 2005/0027643 A1 | 2/2005 | Amaitis et al. |
| 2005/0044019 A1 | 2/2005 | Novick et al. |
| 2005/0049948 A1 | 3/2005 | Fuscone |

(56) References Cited

U.S. PATENT DOCUMENTS

| | | |
|---|---|---|
| 2005/0096931 A1 | 5/2005 | Baker et al. |
| 2005/0097027 A1 | 5/2005 | Kavanaugh |
| 2005/0125326 A1 | 6/2005 | Nangalia et al. |
| 2005/0144104 A1 | 6/2005 | Kastel |
| 2005/0149428 A1 | 7/2005 | Gooch et al. |
| 2005/0165669 A1 | 7/2005 | Montanaro et al. |
| 2005/0209945 A1 | 9/2005 | Ballow et al. |
| 2005/0216384 A1 | 9/2005 | Partlow et al. |
| 2005/0267833 A1 | 12/2005 | Brodersen et al. |
| 2005/0278234 A1* | 12/2005 | Wagner et al. ............... 705/35 |
| 2006/0008016 A1 | 1/2006 | Balakrishnan et al. |
| 2006/0036531 A1 | 2/2006 | Jackson et al. |
| 2006/0100949 A1 | 5/2006 | Whaley et al. |
| 2006/0106700 A1 | 5/2006 | Boren et al. |
| 2006/0106713 A1 | 5/2006 | Tilly et al. |
| 2006/0143099 A1 | 6/2006 | Partlow et al. |
| 2006/0149659 A1 | 7/2006 | Carone et al. |
| 2006/0167788 A1 | 7/2006 | Tilly et al. |
| 2006/0167789 A1 | 7/2006 | Tilly et al. |
| 2006/0253354 A1 | 11/2006 | O'Callahan |
| 2006/0253355 A1 | 11/2006 | Shalen |
| 2006/0253359 A1 | 11/2006 | O'Callahan |
| 2006/0253367 A1 | 11/2006 | O'Callahan et al. |
| 2006/0253368 A1 | 11/2006 | O'Callahan et al. |
| 2006/0253369 A1 | 11/2006 | O'Callahan |
| 2006/0253370 A1 | 11/2006 | Feuser et al. |
| 2007/0011081 A1 | 1/2007 | Bok et al. |
| 2007/0078740 A1 | 4/2007 | Landle et al. |
| 2007/0106585 A1 | 5/2007 | Miller |
| 2007/0112659 A1* | 5/2007 | Shalen et al. ............... 705/35 |
| 2007/0172026 A1 | 7/2007 | Schlomka et al. |
| 2007/0282758 A1 | 12/2007 | Vischer et al. |
| 2008/0059356 A1 | 3/2008 | Brodsky et al. |
| 2008/0065560 A1 | 3/2008 | Bloom |
| 2008/0120249 A1 | 5/2008 | Hiatt |
| 2008/0120250 A1 | 5/2008 | Hiatt, Jr. |
| 2008/0154790 A1 | 6/2008 | Hiatt |
| 2008/0183640 A1 | 7/2008 | Shalen |
| 2008/0243676 A1 | 10/2008 | Smith |
| 2012/0143738 A1* | 6/2012 | McConnel ............... 705/35 |

FOREIGN PATENT DOCUMENTS

| | | |
|---|---|---|
| WO | 00/28449 | 5/2000 |
| WO | 00/48053 | 8/2000 |
| WO | 00/57307 | 9/2000 |
| WO | 00/70506 | 11/2000 |
| WO | 01/22263 A2 | 3/2001 |
| WO | 01/22269 A2 | 3/2001 |
| WO | 01/22313 A2 | 3/2001 |
| WO | 01/22315 A2 | 3/2001 |
| WO | 01/22332 A2 | 3/2001 |
| WO | 01/88808 A1 | 11/2001 |
| WO | 02/37396 A2 | 5/2002 |
| WO | 02/077766 A2 | 10/2002 |

OTHER PUBLICATIONS

Wang, G. et al. "Information Transmission and Electronic Versus Open Outcry Trading Systems: An Intraday Analysis of E-Mini S&P 500 Futures, S&P 500 Index Futures and S&P 500 Cash Index", paper presented in Thailand on Dec. 3-4, 2001.
Tsang, R. "Open outcry and electronic trading in futures exchanges", Bank of Canada Review, Spring 1999, pp. 21-39.
Elind Computers Private LMTD, "Online Global Trading System for Marketplaces", brochure, no date.
C. Danis, et al. "Alternatives to an Open Outcry Market: An Issue of Supporting Cooperation in a Competitive Situation", IBM TJ Watson Research Center, USA.
Clemens et al., "Segmentation, differentiation, and flexible pricing: Experiences with information technology and segment-tailored strategies", Journal of Management Information Systems: JMIS, vol. 11, No. 2, pp. 9-36, Fall 1994.
"Squeezing the poor", Guardian, p. 8, Feb. 11, 1997.
"La libre competencia sacude a las electricas", Actualidad Economica, p. 18, Sep. 30, 1996.
Souter, Gavin, "Bermuda's reinsurers eager to please", Business Insurance, vol. 28, No. 44, p. 77, Oct. 31, 1994.
"The Electronic Component", The Options Institute Online Learning Center, obtained at the internet address: http://www.cboe.com/LearnCenter/cboeeducation/Course_02_02/mod_02_03.html.
"Self-Regulatory Organizations; Notice of Filing of Proposed Rule Change and Amendment No. 1 Thereto by the Pacific Exchange, Inc. Relating to the Exchange's New Trading Platform for Options, PCX Plus", 67 Fed. Reg. 69,580-69,592 (Nov. 18, 2002).
E. Clemons et al., "Information Technology and Screen-Based Securities Trading: Pricing the Stock and Pricing the Trade", Management Science, vol. 43, No. 12, Dec. 1997.
"The Pandora's Box over autoquotes; Industry Trend or Event", Wall Street & Technology, Section No. 3, vol. 13, p. 38; ISSN: 1060-989X, Mar. 1997.
"How is a Trade Executed—Limit Order", Nasdaq, dated Mar. 7, 2000, One Page.
S. Cosgrove, "Courting Retail, Institutional Customers, CBOE, AMEX Get Creative", Knight-Ridder Financial News, Jan. 29, 1993.
Self-Regulatory Organizations: Proposed Rule Change by the Cincinnati Stock Exchange Relating to Small Order Execution Guaranty, 1985 WL 547562; SEC Release No. 22330, Aug. 15, 1985.
A Monitoring Report on the Operation of the Cincinnati Stock Exchange National Securities Trading System, U.S. Securities and Exchanges Commission, May 1981.
A Report on the Operation of the Cincinnati Stock Exchange National Securities Trading System 1978-1981, U.S. Securities and Exchange Commission, Sep. 1982.
CBOT Press Release Entitled "Impressive Project A® Provides Extended Opportunity in CBOT Financial Complex", dated Jan. 1995, printed from the Internet at http://web.archive.org/web/19990429192354/finance/wat.ch/SCFOA/bulletin/_0001960.htm on Oct. 31, 2005, 3 pages.
A. Frino et al., Price and Time-Priority Versus Pro-Rata Algorithms in Electronically Traded Futures Markets: Simulation Based Performance Characteristics, Oct. 3, 1998, http://www.sirca.org.au/research/database.html (Document 1998009.pdf).
A. Frino et al., The Liquidity of Automated Exchanges: New Evidence From Germany Bund Futures, vol. 8, Journal of International Financial Markets, Institutions and Money, pp. 225-241 (1998).
Self-Regulatory Organization; Chicago Stock Exchange, Inc.; Order Approving Proposed Rule Change Creating the Chicago Match System (59 F.R. 63141) SEC Release No. 34-35030, 1994 SEC LEXIS 3863, Nov. 30, 1994.
A. Sarker et al., "Electronic Trading on Futures Exchanges," Current Issues in Economics and Finance, Federal Reserve Bank of New York, vol. 4, No. 1, Jan. 1998.
Self-Regulatory Organization; Order Approving Proposed Rule Change and Notice of Filing in Order Granting Accelerated Approval of Amendment No. 2 to the Proposed Rule Change by the Philadelphia Stock Exchange, Inc. Relating to Enhanced Specialist Participation in Parity Options Trades, SEC Release No. 34-35429, 60 F.R. 12802, Mar. 8, 1995.
CBOE Rules, CCH (1989) (Rules 6.45-8.80).
CBOE Information Circular IC 93-88 (Nov. 18, 1993).
U.S. Congress, Office of Technology Assessment, "Electronic Bulls and Bears: U.S. Securities Markets and Information Technology", OTA-CIT-469 (Washington, DC: U.S. Government Printing Office, Sep. 1990). (selected excerpts).
Self-Regulatory Organizations; Filing and Order Gracting Accelerated Approval of Proposed Rule Change by the Chicago Board Options Exchange, Inc., Relating to System Modifications to the Retail Automated Execution System, SEC Release No. 34-32879, 58 F.R. 49342, Sep. 22, 1993.
CBOE Regulatory Circular RG 91-71, Dec. 25, 1991.
Notice of Receipt of Plan Filed Pursuant to Section 11A(a)(3)(B) of the Securities Exchange Act of 1934, 1980 WL 29398, SEC Release No. 16519, Jan. 22, 1980.

(56) References Cited

OTHER PUBLICATIONS

New York Stock Exchange Constitution and Rules (Commerce Clearing House, Inc. New York Stock Exchange Guide) Jul. 15, 1965, pp. 2644-2645; 2682-2683.
R. Teweles et al., The Stock Market, Fifth Edition, John Wiley & Sons, 1987, pp. 176-181.
J. Meeker, The Work of the Stock Exchange, The Ronald Press Company 1923, pp. 108-109.
CBOE Information Circular IC91-15, Feb. 25, 1991.
Domowitz, Ian, "A taxonomy of automated trade execution", Journal of Inernational Money and Finance (1993), 12, 607-631.
SEC Notice, Release No. 34-37959, SR-CBOE-2002-05, Federal Register vol. 68, No. 110, dated Monday, Jun. 9, 2003, pp. 34441-34448.
Original Rule Filing and Amendment No. 1 to SR-CBOE-2002-05, Submitted to SEC on Jan. 16, 2002, 36 pages.
Amendment No. 2 to SR-CBOE-2002-05, Submitted to SEC on May 16, 2002, 21 pages.
Amendment No. 3 to SR-CBOE-2002-05, Submitted to SEC on Jan. 15, 2003, 69 pages.
Amendment No. 4 to SR-CBOE-2002-05, Submitted to SEC on Apr. 3, 2003, 71 pages.
Amendment No. 5 to SR-CBOE-2002-05, Submitted to SEC on May 15, 2003, 3 pages.
Amendment No. 6 to SR-CBOE-2002-05, Submitted to SEC on May 30, 2003, 8 pages.
SEC Notice, Release No. 34-39086, SR-PCX-97-18, Federal Register vol. 62, No. 185, dated Wednesday, Sep. 24, 1997, pp. 50036-50048.
Angel, James J., "How Best to Supply Liquidity to a Small-Capitalization Securities Market", Georgetown University, Jul. 15, 1996, 27 pages.
Co-Pending U.S. Appl. No. 60/986,727, filed Nov. 9, 2007.
SEC Notice, Release No. 34-46803, SR-PCX-2002-36, Federal Register vol. 67 No. 222, dated Monday, Nov. 18, 2002, pp. 69580-69592.
SEC Notice, Release No. 34-47676, SR-CBOE-2002-05, Federal Register vol. 68 No. 77, dated Tuesday, Apr. 22, 2003, pp. 19865-19874.
SEC Notice, Release No. 34-51107, SR-CBOE-2004-75, Federal Register vol. 70, No. 23, dated Friday, Feb. 4, 2005, pp. 6051-6057.
PCX Plus *The Pacific Exchange*, PCX Plus Overview, Oct. 9, 2003, six pages.
National Association of Securities Dealer, Inc. "NASD Notice to members" 00-65, Sep. 2000, 5 pages.
Special Study: Payment for Order Flow and Internalization in the Options Markets, www.sec.gov/new/studies/ordpay.htm, printed on Oct. 19, 2001, 39 pages.
"smartRay.com Delivers Stock Quotes and Financial Information to Wireless Devices for Free!", PR Newswire, p. 2870, Dec. 16, 1999.
Glen, Jack D., "Trading and information systems in two emerging stock markets", East Asian Executive Reports, v16n12, pp. 8, 14+, Dec. 15, 1994.
Michaels, Jenna, "NASD's Global Fumble", All Street & Technology, v9n11, pp. 57-62, Jul. 1992.
"PHLX Files Rule Changes to Improve Handling Orders on Pace", Securities Week, p. 5, Jul. 17, 1989.
"NYSE Votes to Restrict Computerized Trading", San Jose Mercury News, Feb. 5, 1988.

Raithel, Tom, article titled "Major Changes Seen for Exchanges", Evansville Courier and Press, Apr. 12, 2000, p. B.6.
Demeterfi, Kresimir, et al., "More Than You Ever Wanted to Know About Volatility Swaps," Goldman Sachs Quantitative Strategies Research Notes, Mar. 1999.
CBOE Futures Exchange letter dated May 17, 2004, to Commodity Futures Trading Commission with accompanying pages containing rules, terms, and conditions for a new product to be traded on the CBOE Futures Exchange, 8 pages.
Press Release article, "CBOE Announces Launch of Futures on VIX: First Tradable Volatility Product Will be Offered on New CBOE Futures Exchange," Sep. 5, 2003, two pages.
Sulima, Cheryl, "Volatilitly and Variance Swaps", Capital Markets News, Federal Reserve Bank of Chicago, Mar. 2001.
Bounds for a Volume Weighted Average Price Option, A. W. Stace, Sep. 24, 2004.
Transitions 1-3, Transitions Trading website, retrieved using: www.archive.org Jul. 29, 2004 and Dec. 11, 2004.
Blahnik, Mike, "Internet Opens Up Trading Frontiers", Star Tribune, Metro Edition, Minneapolis, MN, Retrieved from: http://web.archive.org/web/20040322223904/http://www.trade.com/, dated Jul. 25, 2004.
Bogomolny, Laura,: Wanna Make a Bet?, Canadian Business, Toronto, vol. 77, Iss. 21, Oct. 25 to Nov. 7, 2004.
Hull, J. and White, A., "The Valuation of Credit Default Swap Options", *Journal of Derivatives*, vol. 10, No. 3, 2003, p. 40.
Duffie, D. and Huang, M., "Swap Rates and Credit Quality", Mar. 31, 1995.
Sodergreen, John, "Product profile: Economic Derivatives in the Energy Sector", *Futures Industry Magazine*, Jan.-Feb. 2005 issue, retrieved from http://www.futuresindustry/org/fi-magazine-home.asp?v=p&q=1018 on May 20, 2008.
Whaley, Robert. "Return and Rick of CBOE Buy Write Monthly Index", *The Journal of Derivatives*, 2002, pp. 35-42.
Chicago Board of Options Exchange, Inc. Description of the CBOE S & P 500 BuyWrite Index (BXM$^{SM}$), 5 pages, 2004.
Morgan Stanley, "Global Medium-Term Notes, series F", *Registration statement No. 333-117752*, Securities Commission and Exchange, 2004, pp. 22-26.
Chicago Board of Options Exchange, Inc. The New CBOE Volatility Index, 19 pages, 2003.
Vasiliki D. Skintzi, "Implied correlation index: A new measure of diversification", The Journal of Future Markets, Feb. 2005, vol. 25, Iss. 2, pp. 1-3.
U.S. Appl. No. 11/849,835, filed Sep. 4, 2007, entitled "System and Method for Creating and Trading a Derivative Investment Instrument Over a Range of Index Values", Applicant: O'Connell et al.
U.S. Appl. No. 12/112,605, filed Apr. 30, 2008, entitled "System and Method for Creating and Trading a Derivative Investment Instrument Over a Range of Index Values", Applicant: O'Connell et al.
U.S. Appl. No. 12/267,013, filed Nov. 7, 2008, entitled "Method and System for Creating a Volatility Benchmark Index", Applicant: Catherine T. Shalen.
Nimalendran et al., "Do Thinly Traded Stocks Benefit From Specialist Intervention", Jul. 15, 2002, http://papers.ssrn.com/sol3/papers .cfm?abstract_id=319283.
CBOE Exchange Bulletin, Jun. 7, 2002 (CBOE2).
"Competing market makers, liquidity provision, and bid-ask spreads", Bondarenko, O., Journal of Financial Markets 4 (2001) 269-308.

\* cited by examiner

HYBRID TRADING SYSTEM FOR CONCURRENTLY TRADING SECURITIES OR DERIVATIVES THROUGH BOTH ELECTRONIC AND OPEN-OUTCRY TRADING MECHANISMS

CROSS-REFERENCE TO RELATED APPLICATIONS

This application is a divisional of U.S. application Ser. No. 12/560,981, filed Sep. 16, 2009, which is a divisional of U.S. application Ser. No. 10/423,201, filed Apr. 24, 2003, now U.S. Pat. No. 7,613,650, wherein the entirety of each of the aforementioned applications is hereby incorporated herein by reference.

FIELD OF THE INVENTION

The present invention relates to the trading of securities or derivatives, such as options or futures. More particularly, the present invention relates to an exchange system and method for concurrent trading of securities or derivatives through both electronic and open-outcry trading mechanisms.

BACKGROUND

The introduction of electronic trading mechanisms into exchanges for securities and derivatives has been steady and relentless. The desire for immediacy of order execution and dissemination of information is one reason for the steady switch to electronic mechanisms. The simple fact that trading volume is growing, with the accompanying need for an increasingly efficient trading environment, also favors the move toward electronic trading mechanisms.

Electronic exchanges, while efficient and immediate, do not necessarily supply the liquidity available in traditional, open outcry trading environments. One reason for this is the very efficiency that electronic mechanisms bring to an exchange. The speed with which trading takes place can adversely affect market makers by exposing them to unwanted risk. For example, if movement in the underlying security needs to be reflected in the options market, rapid response times are necessary. Communication delays can prevent market makers and others from changing their quotes or orders fast enough to reflect market conditions, thereby leading to smaller quote sizes to reduce the risk. Also, electronic exchanges generally cannot match the price improvement capabilities of an open outcry exchange where floor brokers and market makers can handle large and complex orders face-to-face.

Accordingly, there is a need for an exchange system and method that can address the drawbacks of electronic exchanges.

BRIEF SUMMARY

In order to address the need for improvements on electronic trading mechanisms, a trading platform is disclosed herein that provides efficient and instantaneous electronic executions at the national best bid or offer (NBBO) along with the opportunity for price improvement.

According to a first aspect of the invention, a method of allocating orders for the purchase or sale of options contracts in an exchange configured for trading options contracts by a combination of electronic and open-outcry trading mechanisms is provided. The method includes comparing an incoming order to orders maintained in an electronic database and matching and executing the incoming electronic order against an order resting on the electronic database if the order resting on the electronic database is from a public customer in order to maintain public customer priority. The system then determines the allocation percentage of any remainder of the incoming electronic order among market participants having quotes or orders matching a price of the incoming electronic order by calculating a participation component and a pro rata component for each market participant. The remainder is then distributed for execution by multiplying the determined allocation percentage for each respective market participant by the amount of the remainder.

In another aspect of the invention, open outcry trading is merged with electronic trading in a method of trading derivatives in an exchange having both real-time screen-based trading and open-outcry trading capabilities. The method includes receiving electronic orders for derivatives and allocating a portion of the electronic orders for immediate execution if a portion of the electronic order qualifies for immediate execution according to a first order routing rule. The exchange allocates another portion of the electronic orders to a trading floor for open-outcry trading if the portion of the order qualifies for open-outcry trading according to a second order routing rule. Remaining portions of the electronic orders are placed in an electronic database after the allocation of electronic orders for immediate execution and open-outcry trading. The exchange also permits multiple quotes to be disseminated for a particular product, but only allows market makers physically present on trading floor of the exchange to disseminate quotes.

According to another aspect of the invention, a method of trading derivatives in an exchange is provided where orders for derivatives are collected and placed in an electronic database. The exchange identifies a new quote order from a first market participant, where the price in the new quote matches a respective price in an order resting in the electronic database from at least one of a public customer and an in-crowd broker/dealer. The exchange removes at least a portion of the order in the electronic database, delays automatic execution of the quote against the order, and starts a timer. The exchange reports a market quote indicative of execution of the portion of the order while delaying automatic execution. Before the expiration of the delay timer, the exchange will allow other market participants to share in the order if the other market participants can match the price. The exchange then allocates the order between the market participants at the expiration of the delay timer. In one embodiment, the market participants must be physically present on the floor of the exchange.

According to yet another aspect of the invention, a method of trading derivatives in an exchange is provided to address instances of locked quotes between market makers. The exchange detects a locked quote between a first market maker and a second market maker at an electronic trade engine. Automatic execution of these quotes against one another is delayed and a delay timer is initiated. The locked quote is disseminated to the exchange and permits execution of certain orders against the locked quote. The exchange notifies the first and second market makers of the locked quote after a notification. In one embodiment, only public customers may trade against the locked quote. In another embodiment, the market makers must be in-crowd market participants. In another alternative embodiment, the exchange may detect a crossed quote between first and second market makers and automatically widen the quote spread of one of the two market makers so that the market maker quotes lock.

DETAILED DESCRIPTION OF THE DRAWINGS AND THE PRESENTLY PREFERRED EMBODIMENTS

A system and method for trading securities, such as securities options is described herein. The trading mechanisms and rules described are based on providing incentives or limitations to particular classes of individuals or entities who are involved in trading at an exchange. For purposes of this specification, the following definitions will be used:

Broker/dealer=person or entity registered to trade for itself and/or on behalf of others at the exchange.

Public customer=person or entity, who is not a broker/dealer, trading on their own behalf through a broker/dealer or firm registered to trade at the exchange.

Firm=entity employing persons who represent the firm, or the firm's customers, on the exchange, such as market makers, floor brokers, broker/dealers, or other industry professionals.

Market maker=professional trader registered to trade at the exchange who is required to provide liquidity to a market, for example through streaming quotes for both a bid and an offer at a particular price.

Designated primary market maker (DPM)=market maker designated by the exchange to be responsible for a fair and orderly market, and to provide continuous quotes, for a particular class of options.

Floor broker=individual who represents orders from others in a trading crowd on the floor of an exchange.

Market participant=any person or entity that can submit orders or quotes to an exchange.

In-crowd market participant (ICM)=floor broker, market maker or designated primary market maker physically present on the floor of the exchange.

Non-in-crowd market participant (non-ICM)=market participants who are not physically present on the floor of the exchange.

Class of options=all series of options related to a given underlying security, where the underlying security may be, for example, publicly traded stock of a company.

Figure 1:
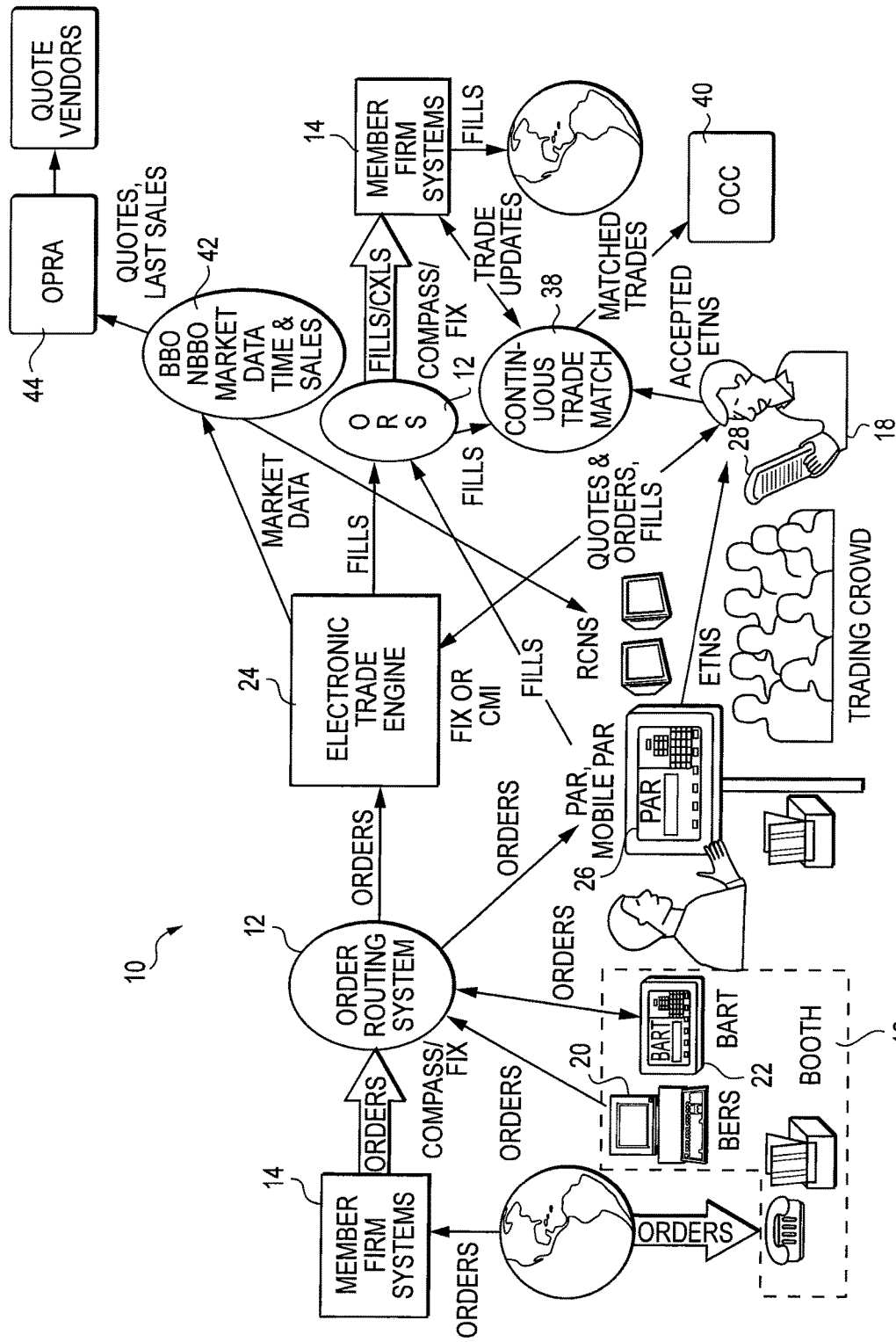
FIG. 1 is a diagram of a hybrid exchange system merging screen-based electronic orders with traditional open-outcry floor trading.

FIG. 1 illustrates one embodiment of a system suitable for implementing the hybrid exchange system combining aspects of electronic, screen-based trading with traditional, open-outcry trading and implement various securities and derivatives trading methods described herein. The system 10 receives orders for the purchase or sale of securities, for example derivatives such as stock options, from numerous sources at a central order routing system (ORS) 12. ORS 12 may be any of a number of data processing systems or platforms capable of managing multiple transactions. In one embodiment, the order routing system can be implemented on a transaction processing facility (TPF) platform manufactured by IBM Corporation. For purposes of clarity, the examples herein will refer specifically to options. It should be understood that the system and methods disclosed herein may be applied to the trading of other types of securities and derivatives. An exchange utilizing the system and methods described herein may manage a number of classes of derivatives, where each of the plurality of classes of derivatives are associated with an underlying asset such as a stock, a bond, a note, a future, an exchange traded fund, an index, a commodity or other known asset types.

Orders may be entered into the ORS 12 from remote member firm systems 14, from member firm's booths 16 physically located at the exchange system 10 and from market makers 18 present on the trading floor of the exchange. The member firm systems 14 may be located remotely from the geographical location of the exchange and use any of a number of standard land-line or wireless communication networks to direct orders electronically to the ORS 12. The member firm systems 14 communicate with one of several interfaces or protocols for transmitting their orders to the ORS 12. Examples of suitable interfaces are those using a distributed object interface based on the CORBA standard and available from the Object Management Group. Interfaces such as financial information exchange (FIX), which is a message-based protocol implemented over TCP/IP available from FIX Protocol, Ltd., or other known securities transaction communication protocols are also suitable protocols. In some instances, orders may even be made by telephone calls or facsimile transmissions directly to the booths 16 of member firms at the exchange. Orders submitted from a booth 16 at the exchange may come from a booth entry and routing system (BERS) 20 or a booth automated routing terminal (BART) 22.

The BERS 20 is a computer workstation that provides firm staff members at the booth with an entry template and a graphic user interface with a number of function buttons arranged on the display. Orders entered at the booth through BERS 20 typically consist of orders that were telephoned to the booth and orders that were wired to member firm-owned house printers in the booth. The orders entered through BERS are entered manually by booth staff using an order template and graphic user interface on the workstation. Generally, an order entered at BERS 20 will be routed to the ORS 12. Member firms, however, may specify that a particular order entered through BERS be routed to the BART 22 device. The BART 22 device, sometimes referred to as the "electronic runner," allows member firms to maintain more control over their order flow. BART 22 allows each firm to customize certain ORS 12 parameters to route a certain portion of their order flow to the firm booth. For example, firms may instruct ORS 12 to send certain orders directly to their booths 16 based on the size of the order.

As with the BERS 20, BART 22 may be implemented on a touch-screen workstation located in the member firm booth. The BART 22 operator at the booth may electronically forward orders to desired destinations. Potential destinations for these booth-routed orders are the ORS 12, the electronic trade engine 24 in communication with the ORS 12, or the public automated routing (PAR) system 26 used by the floor brokers at the exchange. The PAR system 26 may be implemented as a PC-based, touch-screen order routing and execution system accessible by floor brokers on the floor of the exchange. The PAR system 26 terminals allow a floor broker to select an order from the workstation and receive an electronic trading card on which the floor broker may enter trade information such as its volume, price, opposing market makers, etc. When a floor broker completes a card, the floor broker can then execute a trade electronically with the touch of a finger on the touch screen interface. The PAR system 26 then transmits the completed order, also referred to as a "fill," back to the ORS 12. The PAR 26 may be a fixed workstation or a mobile workstation in the form of a hand-held unit.

Market makers 18 on the floor of the exchange may enter quotes and orders via electronic devices, such as hand-held market maker terminals (MMT) 28. The MMT may be any of a number of electronic hand-held devices capable of communicating with the electronic trade engine 24 and ORS 12 through an application programming interface (API) such as FIX version 4.2 or CMi, an API available from Chicago Board Options Exchange, Incorporated of Chicago, Ill. An example of a suitable handheld device is the Fujitsu Stylistic 3500 available from Fujitsu Ltd. of Tokyo, Japan.

Figure 2:
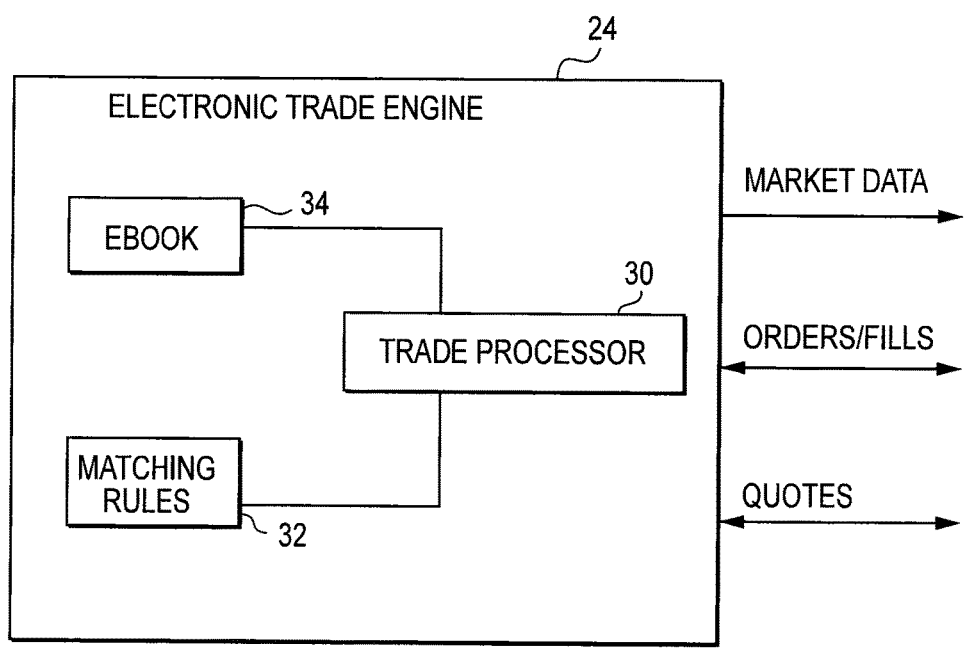
FIG. 2 is a block diagram of the electronic trading engine of FIG. 1.

As illustrated in FIG. 2, the electronic trade engine 24 contains a trade processor 30 that analyzes and manipulates orders according to matching rules 32 stored in the database in communication with the trade processor. Also included in the electronic trade engine is the electronic book (EBOOK) 34 of orders and quotes with which incoming orders to buy or sell are matched with quotes and orders resting on the EBOOK 34 according to the matching rules 32. The electronic trade engine 24 may be a stand-alone or distributed computer system. Any of a number of hardware and software combinations configured to execute the trading methods described below may be used for the electronic trade engine 24. In one embodiment, the electronic trade engine 24 may be a server cluster consisting of servers available from Sun Microsystems, Inc., Fujitsu Ltd. or other known computer equipment manufacturers. The EBOOK 34 portion of the electronic trade engine 24 may be implemented with Oracle database software and may reside on one or more of the servers comprising the electronic trade engine 24. The rules database 32 may be C++ or java-based programming accessible by, or executable by, the trade processor 30.

When a trade is completed, whether on the floor in open outcry and entered into PAR 26 or automatically executed through the electronic trade engine 24, the fill information is sent through the electronic trade engine 24 and ORS 12. ORS 12 passes the fill information to the member firm systems and to a continuous trade match (CTM) system 38 which matches the buy side and sell side of a trade which, in turn, forwards the matched trades to the Options Clearing Corporation (OCC) 40, a third party organization that will verify that all trades properly clear. The electronic trade engine 24 also sends quote and sale update information through an internal distribution system 42 that will refresh display screens within the exchange 10 and format the information for submission to a quote dissemination service such as the Options Price Reporting Authority (OPRA) 44.

Utilizing the system described above, a hybrid trading system retaining the benefits of traditional floor-based open-outcry exchanges and incorporating the efficiency of traditional electronic trading systems may be implemented. One preferred way of maintaining the availability, and associated liquidity, of open-outcry floor trading is to restrict market maker status to individuals who have a physical presence on the trading floor of the exchange, or entities that have a representative physically present on the trading floor of the exchange. Market makers are specific exchange members making bids and offers for their own account in absence of public buy or sell orders in order to spur the market and provide liquidity. In one embodiment, the electronic trade engine 24 receives all quotes and identifies the source of the quote before allowing the quote to trade with, or be placed on, the EBOOK 34. This filtering is preferably accomplished by verifying specific market maker identification information embedded with quote information, for example through appending a unique acronym associated with the market maker to an order, or by only accepting quotes from market maker terminals identifiable as on the premises of the exchange. In one implementation, each market maker is logged into the exchange such that every communication from the market maker to the exchange will be identified based on the login information associated with that market maker.

In addition to permitting entry of quotes from market makers physically present at the exchange over their market maker terminals, a market maker must also orally provide a quote in response to an oral request for a quote on the floor. By maintaining the restriction that all quotes disseminated at the exchange must originate from the floor, individuals or entities who wish to take advantage of market maker status will be available on the exchange floor and maintain more opportunity for handling particularly complex or large volume orders, and provide the opportunity for price improvement over electronic orders.

Referring again to FIGS. 1 and 2, when a market maker 18 enters a quote at a handheld terminal 28, the quote is related to the electronic trade engine 24. The electronic trade engine 24 calculates the best bid or offer (BBO) from among all the quotes and orders entered and, if the quote is at the current BBO, the quote may be immediately matched against incoming orders subject to the various trade mechanisms described herein. If the new quote improves on the BBO, the new BBO is sent to the ORS 12 and is displayed on displays throughout the exchange. Alternatively, if the new quote matches the BBO, the new quote volume is added to the volume of the existing disseminated BBO. The ORS 12 also forwards the new BBO to the national quoting service known as OPRA, which then forwards this information to various quote vendors who subscribe to the OPRA service. If the new quote is not at, or better than, the current BBO, the quote is placed in the EBOOK 34.

When an order is received at the ORS 12, ORS 12 determines whether it qualifies for routing to the electronic trade engine 24. The ORS 12 examines both the order size and price. If the order price is at the market, it may be sent directly to the electronic trade engine for immediate execution. However, each order is also screened based on a two-tier order size analysis. First, the exchange may set a default auto-execution limit such that any amount of the order exceeding that size limit will be routed to the PAR system 26 for open-outcry trading on the floor of the exchange. Second, even if some or all of the order is within the exchange default size limit, each firm or broker may have a separate customized routing instruction that takes precedence over the exchange limit so that some or all of the order that would qualify for auto execution will be routed elsewhere. For example, the firm or broker from whom the order originated may have previously instructed ORS 12 to have their orders routed first to their booth 16 for more detailed handling.

Figure 3:
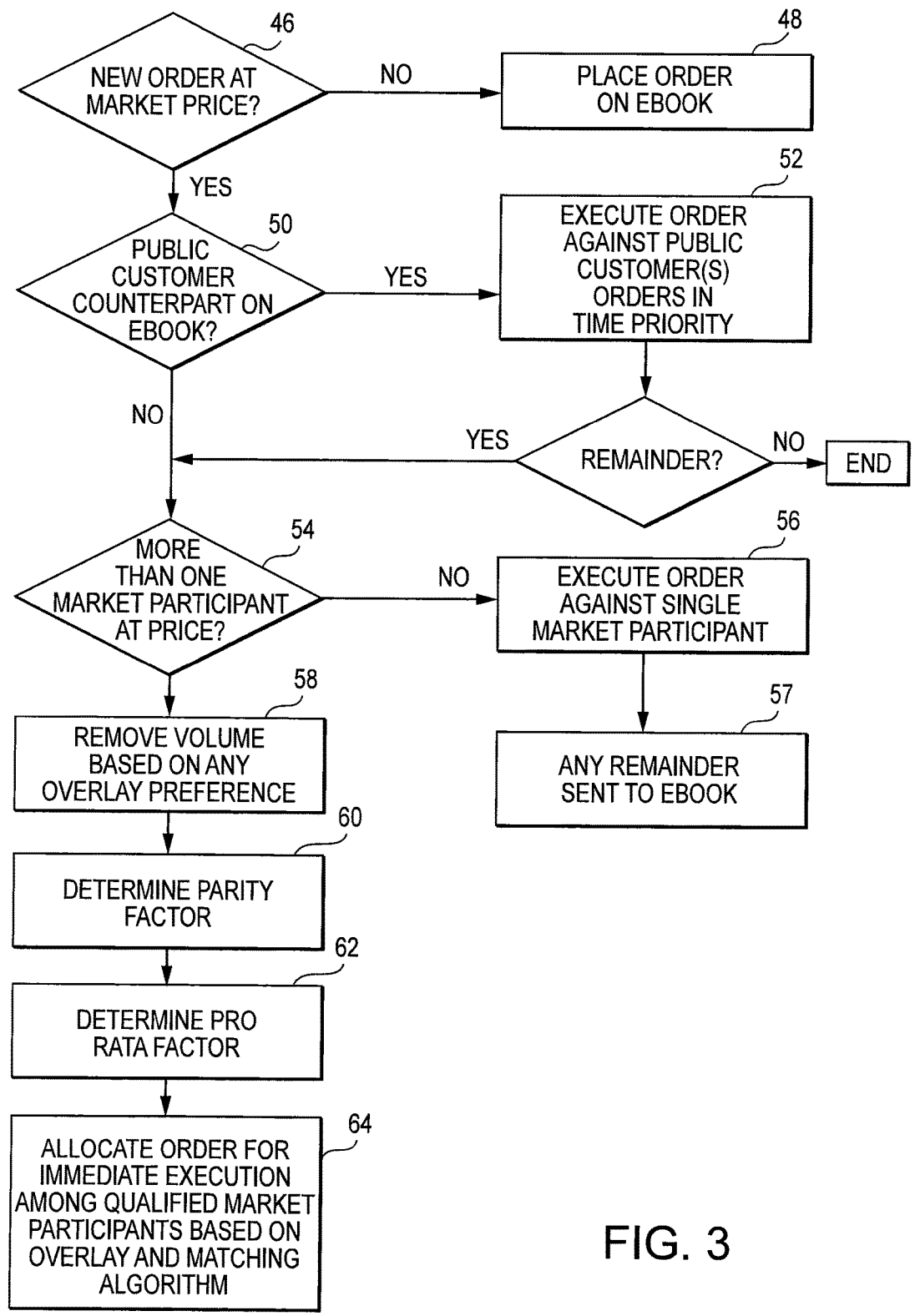
FIG. 3 illustrates a method of allocating orders in the hybrid exchange system of FIGS. 1 and 2.

After passing through ORS 12, the trade processor 30 checks to see if the incoming order is immediately marketable against orders and quotes resting in the EBOOK 34. If the order price on the incoming order to buy or sell matches a counterpart offer to sell or buy on the EBOOK 34, then the order is considered marketable and the trade processor 30 looks at the matching rules database 32 to determine allocation of the incoming electronic order among the various counterpart quotes and orders on the EBOOK 34. According to a first method, as illustrated in FIG. 3, public customer orders resting in the electronic book have priority. If a new order, for example a buy order, arrives at the electronic trade engine that is away from the market price, it is placed on the EBOOK 34 (at steps 46, 48). If the new order is at the current market price, any public customer orders maintained in the EBOOK 34 which are at the same price will execute against the incoming order first and be executed in the order that the booked orders arrived at the EBOOK 34 (at steps 50, 52). Thus, if both the public customer order to sell on the book and an in-crowd market participant quote or order to sell on the book are at the same price, the incoming order to buy is first matched against the public customer order and any unfilled portion of the incoming order may then be executed against the quotes or orders of the in-crowd market participants. In other embodiments, public customer priority may be omitted, or a specific percentage of the incoming order may be allocated to public customers first.

If the incoming order does not match a price of a public customer order in the electronic book 34 and a single market participant is at the disseminated BBO, that market participant's quote is entitled to receive the incoming order up to the size of the market participant's quote (at 54, 56). If the size of the incoming order was such that a portion remains after execution against the market participant's quote, that remainder may be routed to the EBOOK 34 (at 57). In other embodiments, as discussed in greater detail below, the act of a new in-crowd market participant quote or order at the electronic trade engine 24 hitting a non-ICM order will first trigger a temporary trading freeze to allow other in-crowd market participants to submit orders or quotes within a predetermined time period at the same price of the original in-crowd market participant at the BBO and, if in that time period quotes and orders come in having some volume greater than the volume of the incoming electronic order, then that electronic order is allocated among the in-crowd market participants according to a matching algorithm. In yet other alternative embodiments, automatic trading of new public customer orders that are only matched in price by one resting in-crowd market participant order or quote may be delayed a short period to allow other in-crowd market participants to bid or offer. If no additional quotes or orders are submitted at the BBO within the limited time frame of the quote trigger, then the lone market participant quoting at the BBO is entitled to the entire order. In other embodiments, the method of freezing a trade and permitting other in-crowd market participants to obtain a portion of a trade may also be utilized in exchanges operating with screen-based, electronic trading only, without an open-outcry trading floor. In these other embodiments, any market participant quote or order may invoke the quote trigger procedure outlined above and then any subsequent market maker quote or order arriving within a preset time period may take part in the execution against the order.

Referring again to FIG. 3, when more than one market participant is quoting at the BBO, an allocation overlay may be applied to reserve a percentage of the order, or percentage remainder of the order if a public customer order had priority and executed against some of the order, as an incentive to one or more market participants (at step 58). For example, a percentage of the order may be set aside for the in-crowd market participant who first submitted an order (the "market turner") that is now able to execute against the incoming order and the remainder would be sent on to be allocated by the trade processor according to a matching algorithm.

Another example of a priority overlay that may be implemented alone or in combination with the other priority overlays and procedures described herein is a priority for a designated primary market maker (DPM). The DPM overlay may be implemented as a specific percentage of an order being reserved for the DPM prior to allocation among the remaining in-crowd market participants. When used in combination with overlays for public customer priority and market turner priority, the DPM priority may be taken after the execution of any booked public customer orders that can trade with the new order but before the market turner priority. In other embodiments, the DPM may be allowed the greater of the fixed percentage they would receive from the order under the DPM priority or the percentage of the order they would get under a matching algorithm, described below, if the DPM quote was pooled with the remaining in-crowd market participants competing for a portion of the order. Any of the priority overlays described above may be used individually, in any combination, or turned off altogether.

The matching algorithm may include any of a number of criteria. In one embodiment of the matching algorithm, the electronic trade engine 24 allocates incoming orders to the multiple market participants quoting at the same price based on a parity factor and a pro rata, or depth of liquidity, factor calculated for each market participant. The parity factor of the matching algorithm treats as equal all market participants quoting at the relevant BBO (at step 60). Thus, if there were four market participants quoting or bidding at the best price, each would be assigned 25 percent for the parity component of the matching algorithm. Viewed in conjunction with the pro rata factor of the algorithm, the parity component of the algorithm provides incentive to market participants to quote at a better price than their competitors even though they may have a smaller quote size than other market participants quoting at the BBO.

The second component of the matching algorithm rewards those quoting larger sizes at the best price by providing the market participants a pro rata component based on the percentage of the volume of that market participant's quote size with reference to the sum of the total of all quote sizes at the best price (at step 62). For example, if the disseminated quote represents the quotes of market makers x, y, and z who quote for 20, 30, and 50 contracts respectively, then the percentages assigned under the pro rata component are 20% for x, 30% for y, and 50% for z. The parity and pro rata components are weighted, in one embodiment, by averaging the percentage that is derived for each of these components. The final allocation is then determined by multiplying that average by the size of the incoming order available. In one embodiment, the matching algorithm described above produces the following equation:

$$\text{Participant's allocation of incoming order} = \text{incoming order} \\ \text{size } X \left[ \frac{\frac{1}{\text{number of participants}} + \frac{\text{participant quote size}}{\Sigma \text{participant quote sizes}}}{2} \right]$$

The final weighting of the parity and pro rata components set forth above is a straightforward mathematical average of the two components. The allocation based on the matching algorithm and the overlay preference, if any, is then executed among the qualified in-crowd market participants (at step 64).

Other weightings of the components may be used in other embodiments to change the balance of the parity and pro rata components. Additionally, the matching algorithm described above may be tailored to provide additional weight to certain classes of market participants by reducing the parity weight allocated to a particular type of market participant. For example, in one embodiment, market makers may be given preferential treatment by allowing each market maker to receive a full participant share when adding up a number of participants quoting or bidding at the best price, while diminishing the parity share for broker/dealer market participants through lumping all broker/dealer market participants together as a single participant for purposes of the matching algorithm. In one embodiment, all non-market maker market participants are collectively considered one participant for purposes of the matching algorithm. In alternative embodiments, each of a plurality of separately recognized market participant relationships, other than market makers, may each be considered as a separate market participant for purposes of the matching algorithm. In one embodiment, only in-crowd market participants are eligible for allocations. In yet further embodiments, only in-crowd market makers will receive a full participant share when calculating allocation of the order through the matching algorithm.

An example of a trade executed using the public customer priority and matching algorithm with parity and pro rata components is provided below. If an incoming order from a public customer to buy 200 option contracts at $2.00 each arrives at the electronic trade engine 24, the trade engine checks to see what orders and quotes are available to execute against this incoming order. In this example, orders resting on the electronic book 34 to sell include: two public customer orders to sell 50 contracts each at $2.00, three market maker quotes each with offer to sell at $2.00 in volumes of 10, 40, and 50, respectively; and five broker/dealer orders for 20 contracts each at $2.00. The public customer orders resting on the electronic book, a total of 100 contracts, are immediately executed against the incoming order which reduces the remaining incoming order volume to 100 contracts.

Assuming no other overlay preferences are being used, these remaining 100 contracts are allocated according to the matching algorithm. First, the electronic trade engine calculates a parity component. Assuming that broker/dealer participants are reduced in weight by considering all of them together as a single participant for purposes of the matching algorithm, their are four participants, where the three market makers each are a full participant and the five broker/dealers are lumped together as a single market participant. This results in the parity component of 25 percent for each full market participant and 5 percent for each of the broker/dealers who qualify as a partial market participant in the matching algorithm. Accordingly, each of the broker/dealers would have a 5 percent parity component and a 10 percent pro rata component (each of the broker/dealers having the same volume in this example) resulting in an overall allocation of 7.5 percent of the remaining 100 contracts or 7.5 contracts. In the case of fractional contracts resulting from an allocation calculation, a time priority may be implemented to round up the allocation of contracts to broker/dealers who bid or offer at the best price first and to round down number of contracts allocated to those who bid or offer later so that integer number of contracts are exchanged. With respect to the three market makers in this scenario, each receives a 25 percent participation component and a 5, 20, and 25 percent, respectively pro rata share components which, when weighted in a straight average results in an allocation to the market makers of 15, 22.50 and 25 shares allocated, respectively, to these three market makers. In instances such as this, where there are fractional allocations between classes of market participants, a rounding up or down may be randomly allocated to achieve a whole number distribution of contracts consistent with the order size. Alternatively, the inter-class fractional allocation may be corrected based on first to order or quote.

Figure 4:
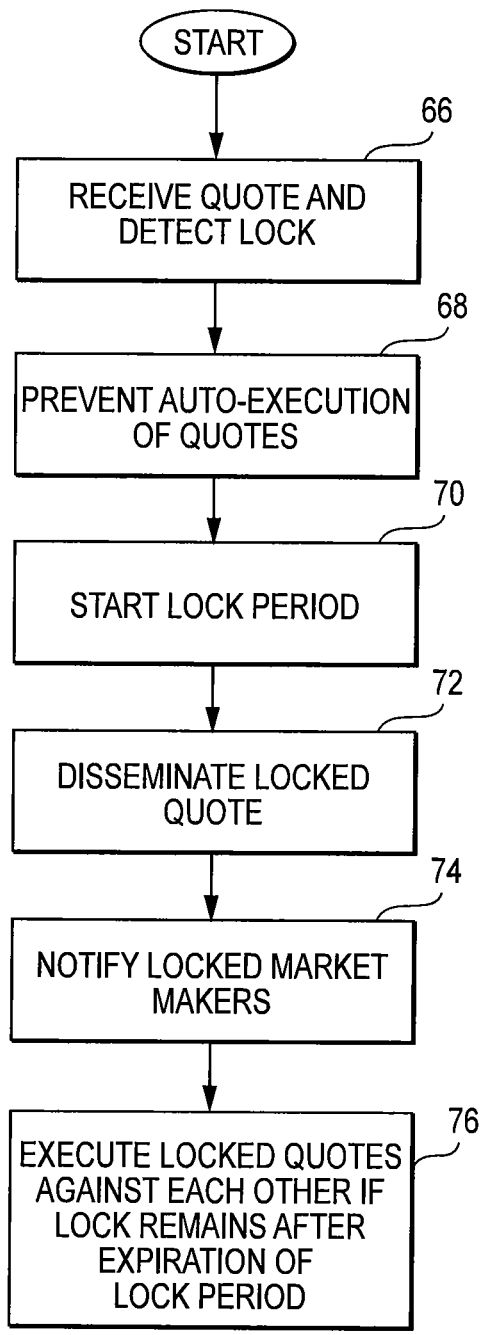
FIG. 4 illustrates a method of handling locked quotes in the hybrid exchange system of FIGS. 1 and 2.

In the hybrid exchange environment described, where electronic, screen-based trading and manual, open-outcry pit trading are interconnected, the ability of multiple market makers on the floor to stream quotes for dissemination to the market on the same particular product may lead to quote interaction such as quote locking or crossing. A quote "locks" another quote when the bid price of an in-crowd market maker's quote matches the offer price of another in-crowd market maker's quote. As shown in FIG. 4, the locking of market maker quotes is detected by the electronic trade engine, which automatically invokes a quote interaction mechanism (at step 66). A delay timer is started and the electronic trade engine prevents the market makers with the locked quotes from trading with each other for a predetermined period set by the delay timer (at steps 68, 70). Although the locked market maker quotes will not automatically trade during the delay period, the locked quote is disseminated to the market and made available for execution against orders from any market participant order that can be routed to the electronic book either directly or through the PAR system (at step 72). After a notification delay, which is a time less than the overall delay timer for preventing the automatic trade, the electronic trade engine will notify each of the locked in-crowd market makers over their respective market maker terminals with a message that includes the identification of the other in-crowd market participants on the other side of the lock (at step 74). At this point, the locked in-crowd market makers can move their quotes away from locking with other in-crowd market makers or they can choose to leave their quotes alone.

After expiration of a complete lock period, which includes the initial notification period, any quotes still locked will automatically trade against each other (at step 76). In one embodiment, if more than one incoming quote locks an existing quote, the time period will not be restarted for the original locked parties each time a new incoming quote is entered. In other embodiments, a new delay timer specific to each new quote that locks against already locked quotes may be implemented to allow each new market maker the same period of time in which to revise their own quote as the initial locked pair.

Incoming quotes will be executed against resting quotes according to the matching algorithm described above and, if an incoming quote locks against more than one resting quote, that incoming quote will also be allocated among the resting quotes using the matching algorithm allocation described above. In one embodiment, the notification period, which is the period after locking within which a notification is sent to each of the locked quoting parties, is one second. The lock period, which is the total period in which the market maker quotes are kept from trading against each other, may be ten seconds. In other embodiments, these preset time periods may be adjusted to suit the specific needs of the exchange. Preferably, the lock period and notification period are monitored and applied at the electronic trade engine 24 based on the matching rule instructions 32 maintained in the electronic trade engine 24.

An example of a locked market scenario handled according to the method described above is as follows (where MM1 and MM2 refer to first and second in-crowd market makers):

If MM1 sends a quote of 1.00-1.20 100×100 (bid-offer bid volume×offer volume) at 9:05:00 and MM2 simultaneously sends a quote of 0.95-1.20 200×200, the disseminated quote is at 1.00-1.20 100×300. If, ten seconds later at 9:05:10, MM3 (a third market maker) sends in a quote at 1.20-1.40 50×50 the quotes from MM1 and MM2 lock with the quote from MM3 so that a disseminated quote is published at 1.20-1.20 50×300. One second later, at 9:05:11, a locked market message is sent to each of MM1, MM2 and MM3. Assuming that none of the market makers decide to change their quotes, 50 contracts will be traded at 1.20 and allocated among MM1 and MM2 through the matching algorithm described above (assuming equal weighting of the parity component and pro rata components, of 21 contracts to MM1 and 29 contracts to MM2, at 9:05:20. Following execution of the 50 contract trade, the quote disseminated to the market would be at 1.00-1.20 100×250. In one embodiment, if the resting market marker quote is removed from the book prior to expiration of the lock period, the later, incoming quote will be restored to its original value. Similarly, if the resting quote and incoming quote lock, and a trade occurs between the two quotes leaving remaining volume to be traded in the incoming quote, the incoming quote will also be restored to its original value.

Figure 5:
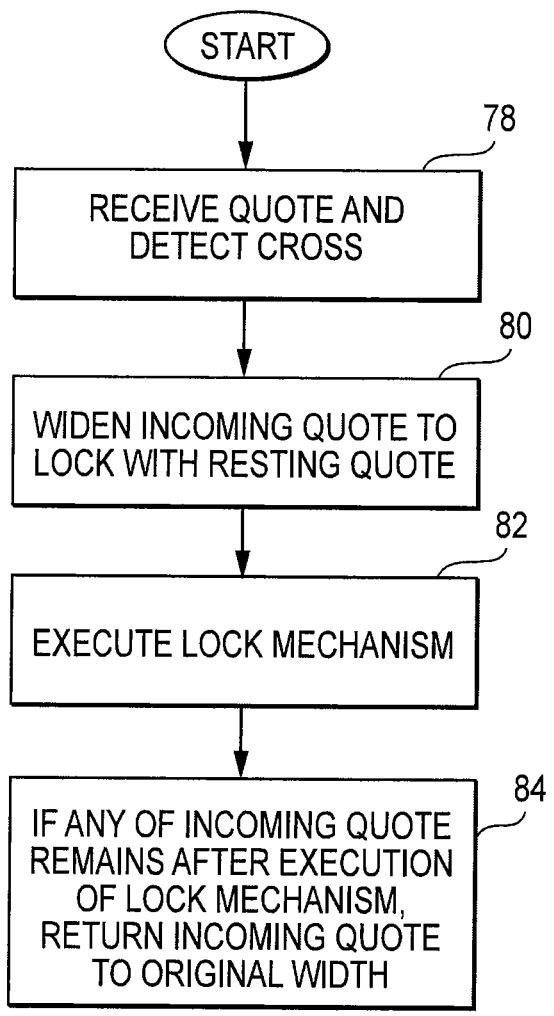
FIG. 5 illustrates a method of handling crossed quotes in the hybrid exchange system of FIGS. 1 and 2.

In some instances, market maker quotes may cross during trading. A crossed quote occurs when the bid of a one market maker's quote is higher than an offer of another market maker's quote. For example if MM1 has a quote resting on the EBOOK 34 of 1.20-1.30 and MM2 later comes in with a quote at either 1.05-1.15 or 1.35-1.45, then the quote are "crossed." A crossed quote, if disseminated to the market, would show a bid price that is higher than an offer price, for example 1.35-1.15. This situation is generally considered unacceptable to an exchange because market makers trading with each other will remove liquidity from the market and because crossed quotes set up a perfect arbitrage. Because of these problems, crossed quotes are not disseminated. In one embodiment, referring to FIG. 5, the trade processor 30 will automatically identify and alter the later arriving quote that would cross with the quote already resting on the EBOOK 34 (at step 78). The trade processor 30 will widen the later quote to fully lock with the first market maker's quote and prevent dissemination of the crossed quote (at step 80). Thus, in the example of MM1 and MM2 above, the exchange will automatically move MM2's quote from 1.05-1.15 to 1.05-1.20 or from 1.35-1.45 to 1.30-1.45 so that the quotes are "locked." The remaining steps for handling the now locked quotes will be the same as in FIG. 4 (at step 82). If the widened quote, or any portion, remains after expiration of the delay time and execution against the resting locked quote, the widened quote will be returned to its original width and disseminated accordingly (at step 84).

Numerous variations of market maker quotes locking or crossing, mixed with on-going receipt of orders from customers to execute against the bid or offer of the resulting locked quotes, may be handled according to the methods described above. In one embodiment, the notification and lock period used for locked quotes will be the same as those used for crossed quotes. The locked market notification message will be sent to in-crowd market participants in crossed quote situations and locked quote situations. In other embodiments, the quote locking and crossing procedures described above may be used in electronic-only exchanges where all other specific classes of market participants, such as all market makers, will invoke these procedures.

In another embodiment, an additional trading mechanism may be implemented to foster and encourage participation in trades by temporarily restraining execution of an in-crowd market participant quote that arrives at the electronic trade engine 24 that is marketable against a resting order on the EBOOK 34 that is not from an in-crowd market participant. The purpose of the temporary restraint on execution is to allow a preset grace period within which other in-crowd market participant quotes or orders maybe submitted at the best price represented by the new in-crowd market participant quote. Advantages of temporarily restraining this type of trade included encouraging more in-crowd market participants to quote at the best price and the removal of any communication or computer hardware advantage among the in-crowd market participants. In one embodiment, delaying execution of the resting order consists of delaying allocation of the resting order.

Figure 6:
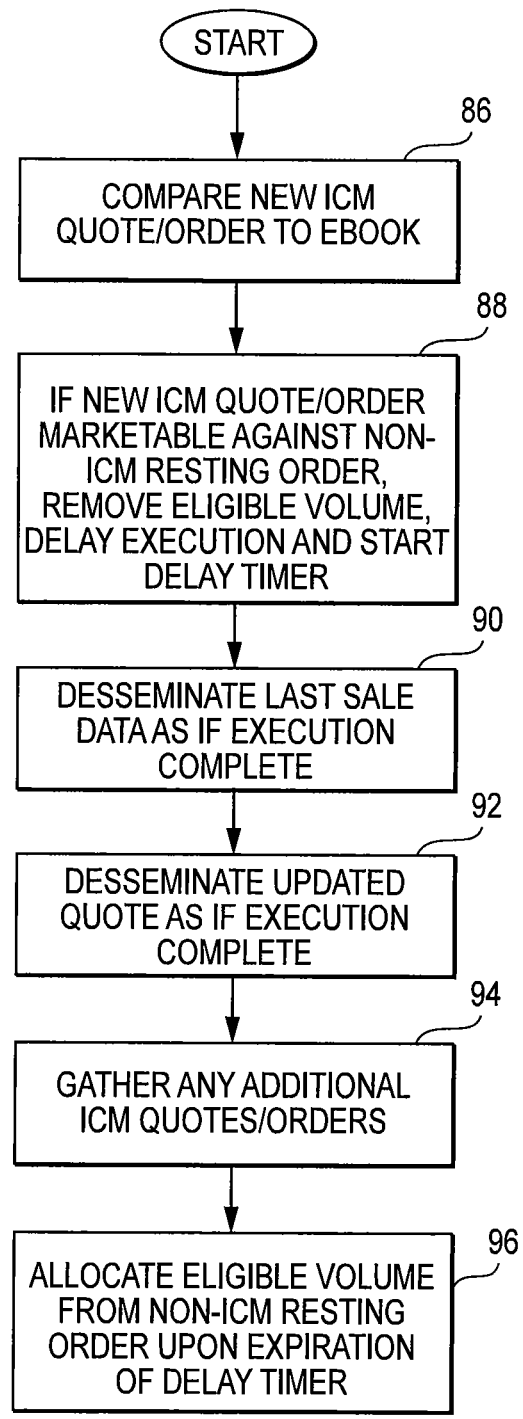
FIG. 6 illustrates a method of enhancing market participation in the hybrid exchange system of FIGS. 1 and 2.

One embodiment of an implementation of this quote trigger mechanism is illustrated in FIG. 6. Upon detecting a quote from an in-crowd market participant at a new best price which would match against an order on the electronic book from a non-ICM, the electronic trade engine 24 will remove the quantity of the resting order that would be tradeable against the incoming quote and hold it and the incoming quote for a predetermined period of time (at steps 86, 88). Any desired preset hold period may be used, however in one embodiment it is contemplated that a five second hold period is used. In other embodiments, the hold period may be fixed anywhere in the range of 0.5-5.0 seconds. After removing the quantity of the resting order, the electronic trade engine 24 will treat the removed quantity of resting order as having been sold and disseminate a last sale market data message so that the OPRA system 44 will indicate the trade has taken place (at step 90). The electronic trade engine 24 will update the top-of-the-market (i.e. update the quote) as though the trade had immediately occurred (at step 92).

During the hold period, any other in-crowd market participant quotes orders that would also be marketable against the original resting order are gathered and the resting order volume at the current best price will be further reduced, if any still remains in the book (at step 94). At the expiration of the hold period, the accumulated in-crowd market participant quotes and orders are traded against the resting orders (at step 96). If the size of the resting order was greater than the size of the sum of the in-crowd market participant quotes and orders, each of the quotes and orders would execute fully against the resting order. If the size of the resting order is less than the sum of the in-crowd market participant quotes and orders, the resting order is allocated among the quotes and orders according to the matching algorithms discussed above. The electronic trade engine will then send fill reports of the executed trades to the ORS 12 for distribution to the appropriate source of the quotes or orders involved.

In order to provide a market and control the opening trades in the hybrid exchange 10 described above, a market opening procedure may be implemented that varies from the steady-state trading mechanisms described above. In the context of a hybrid exchange for securities options, opening takes place after the market for the underlying security is underway. Opening, in the securities option exchange, is considered to last for the period of time it takes to calculate an opening price. The electronic trade engine 24, utilizing start-up rules stored in its matching rules 32 database, will publish an expected opening price (EOP) and an expected opening size (EOS) to the market through the various APIs supported by the exchange. The EOP is updated as pre-market conditions change.

In one embodiment, the opening procedure starts when the opening trade for the underlying security is received. The electronic trade engine 24 will then start a timer and move into an opening rotation state. In the opening rotation state, the EOP and EOS are calculated based on size and prices of orders and quotes received prior to opening of the market and disseminated to DPMs and market makers. After the timer expires, the electronic trade engine 24 will look to see if a valid quote has been submitted by the DPM for each series of options. If valid quotes exist, the market will proceed to open. If a DPM has not entered a valid quote, the electronic trade engine 24 will not proceed to opening, thereby allowing a DPM to delay the opening process if necessary. When there is an imbalance between buy and sell orders at opening, a matching algorithm is applied. The matching algorithm may be as described above or it may be some other algorithm, for example a first in first out (FIFO) algorithm. In one embodiment, as with any of the algorithms and procedures described above, the exchange may control opening procedure algorithm choice by class or series and by day so that a variety of combinations of procedures may be implemented for a particular class or series of securities options on any given day. In one version of an opening procedure, quotes will immediately trade against quotes and no quote locking delay will be implemented.

As has been described above, the hybrid exchange system merges electronic and open outcry trading models while at the same time offering certain market participants the ability to stream electronically their own quotes. Incoming electronic orders from public customers and certain types of broker/dealers that execute against market participants' quotes will be allocated to the best quoters pursuant to a trade matching algorithm. This trade matching algorithm retains public customer priority and rewards in-crowd market participants pursuant to a formula that balances the concepts of quoting at the best price with providing liquidity at the best price. The ability to stream electronic quotes combined with the ability to receive electronic and instantaneous allocations of incoming orders will reward in-crowd market participants that quote at the best price and may have the attendant benefit of tightening the exchange's best disseminated quote.

The disclosed hybrid exchange system and method also retains the benefits inherent in a floor-based, open outcry exchange. Order entry firms will continue to have the ability to have their floor brokers walk into a trading crowd and request markets on behalf of their customers. Trading crowds may continue to offer price discovery to orders of size, complex orders, and other orders that are exposed to the open outcry, auction market environment. Additionally, the hybrid exchange system and method enhance the automatic execution capabilities of broker/dealers. For example, non-market maker broker/dealers have the same access to the electronic execution features as public customers in designated classes. This allows eligible broker/dealers (e.g. non-ICM broker/dealers) to receive more automatic executions of the orders they route to the exchange.

Also, the disclosed hybrid exchange system and method "opens the book" to certain types of broker/dealer orders. In one implementation, broker/dealer orders are only permitted access to an autoexecution feature that allows for immediate electronic execution of orders routed to the exchange. For example, certain broker/dealer orders will be eligible for placement into the EBOOK 34 against which they may be executed electronically. Broker/dealers may also electronically access the EBOOK 34 (i.e., buy or sell the book) in eligible classes. This feature will allow for the automatic execution of broker/dealer orders against resting limit orders in the book, whether they are public customer or broker/dealer orders in the book.

Although the system and methods described herein preferably relate to a hybrid system incorporating and involving active participation from a trading floor and a screen-based electronic trading crowd, many of the procedures described may be applied to an exclusively electronic, screen-based exchange that does not include floor based, open-outcry trading. As will be appreciated by those of ordinary skill in the art, mechanisms for the priority overlays, quote crossing, quote locking, matching algorithm and other features described above may all be modified for application to electronic-only trading. For example, by altering several of the rules relating to which market participants may obtain the benefit of these procedures from in-crowd market participants to other combinations of market participants, an improved electronic marketplace may also be achieved.

It is therefore intended that the foregoing detailed description be regarded as illustrative rather than limiting, and that it be understood that it is the following claims, including all equivalents, that are intended to define the scope of this invention.

The invention claimed is:

1. A method of trading derivatives in a hybrid exchange system comprising:
    collecting orders, via a communication network and order routing system, for derivatives and placing them in an electronic book database;
    identifying at an electronic trade engine a new quote from a first in-crowd market participant, wherein one of a bid or an offer price in the new quote matches a respective price in an order in the electronic book database from a public customer;
    removing at least a portion of the order in the electronic book database, delaying automatic execution of the new quote and the order, and starting a timer;
    reporting, via the communication network and an electronic reporting system, a market quote indicative of execution of the at least a portion of the order while delaying automatic execution;
    receiving at the electronic trade engine a second quote from a second in-crowd market participant after receiving the new quote from the first in-crowd market participant and before an expiration of the timer, wherein the second quote matches the respective price of the public customer order in the electronic book database; and
    allocating the order between the first and second in-crowd market participants at the electronic trade engine, wherein the order is not executed until expiration of the timer.

2. The method of claim 1, wherein the timer expires in a fixed period of time.

3. The method of claim 2, wherein delaying automatic execution comprises delaying allocation of the portion of the order.

4. The method of claim 2, wherein the fixed period of time is one second.

5. The method of claim 1, wherein a quantity of the order is less than a sum of the quantities of the new quote from the first market participant and the second quote from the second market participant, whereby each of the first and second market participants execute only a portion of their respective quote quantities.

6. The method of claim 1, wherein the first market participant and the second market participant are in-crowd market participants, wherein each in-crowd market participant is a person physically present on a trading floor of the exchange.

* * * * *